US 6,429,162 B1

(12) United States Patent  (10) Patent No.: US 6,429,162 B1
Prassas  (45) Date of Patent: *Aug. 6, 2002

(54) GLASS FOR HIGH AND FLAT GAIN 1.55 μM OPTICAL AMPLIFIERS

(75) Inventor: Michel Prassas, Vulaines-sur-Seine (FR)

(73) Assignee: Corning Inc., Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/486,878

(22) PCT Filed: Aug. 12, 1998

(86) PCT No.: PCT/US98/16791
§ 371 (c)(1),
(2), (4) Date: Mar. 3, 2000

(87) PCT Pub. No.: WO99/13541
PCT Pub. Date: Mar. 18, 1999

(30) Foreign Application Priority Data

Sep. 5, 1997 (FR) ............................................. 97 11054

(51) Int. Cl.[7] .............................. H01S 3/00; H01S 3/17; C03C 3/247; C03C 3/23; C03C 4/12
(52) U.S. Cl. ........... 501/44; 252/301.4 P; 252/301.4 H; 359/333; 359/341; 359/343
(58) Field of Search ..................... 501/44; 252/301.4 P, 252/301.4 H; 359/343, 333, 341

(56) References Cited

U.S. PATENT DOCUMENTS

| 4,120,814 A | * 10/1978 | Izumitani et al. ..... 252/301.4 P |
| 4,806,138 A | 2/1989 | Miura et al. |
| 4,962,995 A | 10/1990 | Andrews et al. |
| 5,084,880 A | 1/1992 | Esterowitz et al. |
| 5,313,477 A | 5/1994 | Esterowitz et al. |
| 5,706,124 A | * 1/1998 | Imoto et al. |
| 5,764,404 A | * 6/1998 | Yamane et al. |
| 5,808,789 A | * 9/1998 | Edagawa et al. |

FOREIGN PATENT DOCUMENTS

| EP | 0 371 716 A | 6/1990 |
| FR | 1 527 101 A | 9/1968 |
| FR | 2 381 724 A | 9/1978 |

OTHER PUBLICATIONS

"Widely Tunable Single–Frequency Erbium–Ytterbium Phosphate Glass Laser" Taccheo, S., et al *App Phys Lett*, 68 (19), May 6 1996, pp. 2621–2623.
"Diode Array–pumped Er, Yb: Phosphate Glass laser" Hutchinson, J.A., et al., *App Phys Lett*, 60 (12), Mar. 23 1992, pp. 1424–1426.

* cited by examiner

Primary Examiner—C. Melissa Koslow
(74) Attorney, Agent, or Firm—Mary Y. Redman

(57) ABSTRACT

The invention relates to a family of erbium-doped fluorophosphate glasses for use in optical signal amplification and which are doped, for 100 parts by weight constituted by:

| | | | |
|---|---|---|---|
| $P_2O_5$ | 15–40 | $MgF_2$ | 0–10 |
| $Al_2O_3$ | 0–5 | $CaF_2$ | 0–25 |
| MgO | 0–9 | $SrF_2$ | 0–25 |
| CaO | 0–9 | $BaF_2$ | 0–20 |
| SrO | 0–9 | $KHF_2$ | 0–2 |
| BaO | 0–45 | $K_2TiF_6$ | 0–2 |
| $AlF_3$ | 5–25 | | | with up to 10 parts by weight of erbium oxide.

The glasses according to the present invention exhibit a high gain and very flat spectrum over the 1550 nm bandwidth. These glass compositions are particularly well suited for use in fiber or planar optical amplification in WDM and similar applications.

12 Claims, 9 Drawing Sheets

GLASS FOR HIGH AND FLAT GAIN 1.55 µM OPTICAL AMPLIFIERS

TECHNICAL FIELD OF INVENTION

The present invention relates generally to the field of optical signal amplifiers and in particular, to fluorophosphate glass compositions for use in optical signal amplifiers operating at wavelengths around 1.55 µm.

BACKGROUND OF THE INVENTION

Optical signal amplifiers have quickly found use in optical telecommunication networks, particularly in those networks using optical fiber over long distances. Although modem silica-based optical fibers general exhibit relatively low loss in the 1.55 µm window, they are lossy to some extent and the loss accumulates over distance. To reduce this attenuation, opto-electronic devices have been used to boost signal power. These devices require that the optical signal be converted to an electronic signal. The electronic signal is then amplified using commonly known amplification techniques and is reconverted back to an optical signal for re-transmission.

Optical signal amplifiers amplify optical signals without requiring an opto-electronic conversion of the signal. In optical amplifiers, the weakened light signal is directed through a section of an amplifying medium that has been doped with ions from a rare earth element. Light from an external light source, typically a semi-conductor laser, is pumped into the amplifying medium stimulating the rare earth atoms to a higher energy level. Light entering the amplifying medium at the signal wavelength further stimulates the excited rare earth ions to emit their excess photon energy as light at the signal wavelength in phase with the signal pulses, thereby amplifying the light signal. One type of optical amplifier uses a length of erbium-doped optical fiber. Erbium-doped fiber amplifiers (EDFA) are usually doped on the order of 100–500 ppm of erbium ion. Typical EDFA fiber lengths are on the order of 10–30 meters, depending on the final gain requirements necessary for a particular application. In some applications, it is impractical to use a 10–30 meter length of fiber. Planar-type optical amplifiers have been developed for use in more confined spaces. The useful length of a planar amplifying device is generally no more than 10 centimeters. To achieve the same amplification levels as a 10 to 30 meter length EDFA, a planar amplifier requires an amplifying medium with a higher concentration of erbium ions, on the order of up to 4 to 7 percent by weight.

However, in known types of optical amplifying medium, several gain loss mechanisms occur at high erbium ion concentration levels, including ion clustering and cooperative homogenous upconversion (concentration quenching). Because erbium ions do not dissolve well in a silica matrix, erbium ions will cluster, allowing energy transfer in the clustered region. In addition, at higher erbium concentrations, ion-to-ion interaction becomes more significant. The resulting energy upconversion quenches the inverted population. Erbium ion energy is used in the clustering and quenching processes and is therefore unavailable for the required amplifying phonon process. As a result, quantum efficiency of the amplifying medium decreases rapidly with higher erbium ion concentration, with a concomitant decrease in amplifier gain.

Yet further, known silica-based erbium-doped amplifiers exhibit a distinct spectral nonuniformity of gain. The lack of a flat gain spectrum over a wide bandwidth causes several problems. For instance, extremely short optical pulses have a relatively wide power spectrum and are not accurately amplified if the gain spectrum is not flat. In addition, in larger bandwidth applications, such as wavelength division multiplexing (WDM), the fiber receives data-modulated optical signals from several optical transmitters, each using a different optical carrier frequency. If the gain spectrum from the optical amplifier is not flat over the operating wavelength, the carrier frequencies at gain peaks might saturate while the carrier frequencies at the skirts and valleys may not be sufficiently amplified. Past efforts to address gain flattening have primarily relied on passive or active filtering of the high gain features of the gain spectrum. However, this requires a close matching of the particular amplifier and filter and must account for temporal variations in the gain spectrum.

SUMMARY OF THE INVENTION

The present invention is concerned with a family of glasses that find particular utility in production of optical signal amplifiers. These glasses are doped with high concentrations (up to 10 wt. %) of erbium oxide while exhibiting weak concentration quenching behavior. These glasses also provide higher fluorescence efficiency an more uniform gain characteristics than known silicate and fluorozirconate glass medium. These glasses provide high and flat gain characteristics that are particularly useful for optical amplification in the 1.55 µm optical wavelength window, and are particularly well suited for use in wavelength division multiplexing (WDM) systems One aspect of the present invention is directed to a family of glasses, particularly fluorophosphate glasses, that are particularly well suited for high rare earth ion concentration levels. It is an object of the present invention to provide a fluorophosphate glass medium doped with erbium oxide ions for use in an optical amplifier for providing flat and high gain in an optical wavelength window around 1.55 µm. The fluorophosphate glasses of the present invention comprise high concentrations of erbium ions (i.e. close to 10% by weight) and provide a more spectrally uniform gain, similar to ZBLAN <-->, and significantly improved over typical silicate and phosphate glass compositions.

The present invention is directed to a family of glass for optical amplification comprising a substantially silica free fluorophosphate glass medium, doped for 100 parts by weight constituted of:

| | | | |
|---|---|---|---|
| $P_2O_5$ | 15–40 | $MgF_2$ | 0–10 |
| $Al_2O_3$ | 0–5 | $CaF_2$ | 0–25 |
| MgO | 0–9 | $SrF_2$ | 0–25 |
| CaO | 0–9 | $BaF_2$ | 0–20 |
| SrO | 0–9 | $KHF_2$ | 0–2 |
| BaO | 0–45 | $K_2TiF_6$ | 0–2 |
| $AlF_3$ | 5–25 | | | with up to 10, preferably between 0.01 and 10, parts by weight of erbium oxide.

Preferably, the fluorophosphate glass according to the present invention has a composition, comprising in parts by weight:

| | | | |
|---|---|---|---|
| $P_2O_5$ | 16.9–24.0 | $MgF_2$ | 0–7.5 |
| $Al_2O_3$ | 1.6–3.2 | $CaF_2$ | 0–18.7 |
| MgO | 0–5.0 | $SrF_2$ | 0–19.7 |
| CaO | 0–5.1 | $BaF_2$ | 1.5–11.3 |
| SrO | 0–8.5 | $KHF_2$ | 0–1.3 |
| BaO | 2.7–43.2 | $K_2TiF_6$ | 0–0.6 |
| $AlF_3$ | 9.5–19.3 | | |

The fluorophosphate glass according to the present invention may also be co-doped with up to 15 parts by weight of $Yb_2O_3$ as a sensitizer to increase pump efficiency at around 980 nm. The fluorophosphate glass according to the invention preferably has an index of refraction between about 1.48 and 1.58.

According to another aspect, the present invention is directed to an erbium-doped optical amplifier for a wavelength band of approximately 1.55 μm, having a medium for optical amplification comprising a substantially silica free fluorophosphate glass composition that further comprises in addition to 100 parts by weight of other components, about 0.01 to 10 parts by weight of $Er_2O_3$. The optical amplifier according to the present invention may be either a planar-type optical amplifier or a single mode fiber type optical amplifier.

The optical amplifier according to the present invention includes fluorophosphate glass comprising, for 100 parts by weight constituted by:

| | | | |
|---|---|---|---|
| $P_2O_5$ | 15–40 | $MgF_2$ | 0–10 |
| $Al_2O_3$ | 0–5 | $CaF_2$ | 0–25 |
| MgO | 0–9 | $SrF_2$ | 0–25 |
| CaO | 0–9 | $BaF_2$ | 0–20 |
| SrO | 0–9 | $KHF_2$ | 0–2 |
| BaO | 0–45 | $K_2TiF_6$ | 0–2 |
| $AlF_3$ | 5–25 | | | up to 10, and preferably between 0.01 and 10 parts by weight of erbium oxide.

The fluorophosphate glass used for the optical amplifier according to the present invention may also be doped with up to 15 parts by weight of $Yb_2O_3$ as a sensitizer to increase pump efficiency at around 980 nm, and preferably has an index of refraction between about 1.48 and 1.58. Optical amplifiers according to the present invention are particularly useful in wavelength division multiplexing (WDM) systems.

BRIEF DESCRIPTION OF THE DRAWINGS

Other features and advantages of the invention will be seen from the following detailed description and referring to the annexed drawings, given by way of example only, and in which.

DETAILED DESCRIPTION OF THE INVENTION

The present invention relates to a family of glasses having utility particularly in lighting, optical and electronic applications. The glasses have unique features that render them particularly useful in the production of optical signal amplifiers.

One feature of these glasses is their substantial freedom from $SiO_2$. Erbium ions do not dissolve well in a silica matrix, thus promoting ion clustering and degrading gain efficiency, such that the removal of the silica matrix enables ion clustering to be prevented, and excess ion photon energy to be preserved for amplification. The glasses according to the present invention contain a relatively high concentration of $P_2O_3$. The present invention is directed to a family of glasses for optical amplification comprising a substantially silica free fluorophosphate glass medium, doped for 100 parts by weight of other components, with up to 10 parts by weight of erbium oxide. Table 1 sets forth the essential composition ranges for the fluorophosphate glass according to the present invention.

TABLE 1

(parts by weight)

| | | | |
|---|---|---|---|
| $P_2O_5$ | 15–40 | $MgF_2$ | 0–10 |
| $Al_2O_3$ | 0–5 | $CaF_2$ | 0–25 |
| MgO | 0–9 | $SrF_2$ | 0–25 |
| CaO | 0–9 | $BaF_2$ | 0–20 |
| SrO | 0–9 | $KHF_2$ | 0–2 |
| BaO | 0–45 | $K_2TiF_6$ | 0–2 |
| $AlF_3$ | 5–25 | | |

The family of erbium-doped glasses according to the invention may further comprise about 0.01 to 15 parts by weight of $Yb_2O_3$ to be used as a sensitizer to increase pump efficiency at around 980 nm. Table 2 defines narrower, preferred ranges of oxide constituents of the present glasses. Optimum properties for optical signal amplifiers, and their production, obtain within these narrower ranges.

TABLE 2

(parts by weight)

| | | | |
|---|---|---|---|
| $P_2O_5$ | 16.9–24.0 | $MgF_2$ | 0–7.5 |
| $Al_2O_3$ | 1.6–3.2 | $CaF_2$ | 0–18.7 |
| MgO | 0–5.0 | $SrF_2$ | 0–19.7 |
| CaO | 0–5.1 | $BaF_2$ | 1.5–11.3 |
| SrO | 0–8.5 | $KHF_2$ | 0–1.3 |
| BaO | 2.7–43.2 | $K_2TiF_6$ | 0–0.6 |
| $AlF_3$ | 9.5–19.3 | | |

TABLE 4

| | | | |
|---|---|---|---|
| $P_2O_5$ | 16.9–24.0 | $MgF_2$ | 0–1.5 |
| $Al_2O_3$ | 1.6–3.2 | $CaF_2$ | 0–18.7 |
| MgO | 0–5.0 | $SrF_2$ | 0–19.7 |
| CaO | 0–5.1 | $BaF_2$ | 1.5–11.3 |
| SrO | 0–8.5 | $KHF_2$ | 0–1.3 |
| BaO | 2.7–3.2 | $K_2TiF_6$ | 0–0.6 |
| $AlF_3$ | 9.5–19.3 | | |

Figure 1:
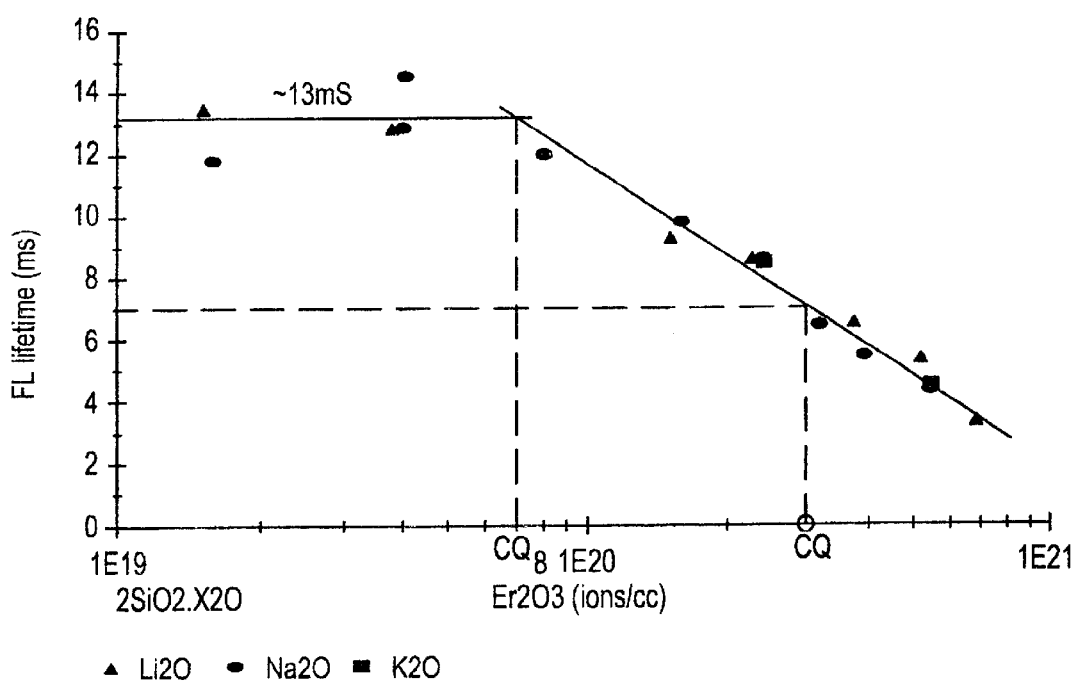
FIGS. 1 and 2 are graphs illustrating typical behavior of concentration quenching on fluorescence lifetime and efficiency of binary silicate glass.

The erbium-doped optical amplifier according to the invention may further comprise about 0.01 to 15 parts by weight of $Yb_2O_3$, to be used as a sensitizer to increase pump efficiency at around 980 nm. The optical amplifier according to the present invention may take any number of forms, as long as the medium is capable of being doped with erbium ions. The optical amplifier could also be a planar-type optical amplifier. The effects of concentration quenching on typical binary silica-based glasses is illustrated in FIG. 1. At low concentration levels of $Er_2O_3$, less than 5E19 ions/cc, (the equivalent of less than 0.5 parts by weight), the fluorescence lifetime is constant. Above this concentration level, fluorescence lifetime decreases rapidly as concentration increases. Two characteristic concentrations can be defined in order to differentiate glasses. The concentration $C_{qb}$ corresponds to the onset of concentration quenching. The concentration $C_q$ corresponds to the concentration level where the fluorescence lifetime is divided by 2. As—illustrated in FIG. 1, concentration quenching begins in typical binary silicate glasses when $C_{qb}$=7E19 ions/cc (or approximately 0.9 parts by weight). At this point, fluorescence lifetime is approximately 13 ms. When $C_{qb}$=3E20 ions/cc (or approximately 3 parts by weight, the fluorescence lifetime is approximately 7.5 ms.

Figure 2:
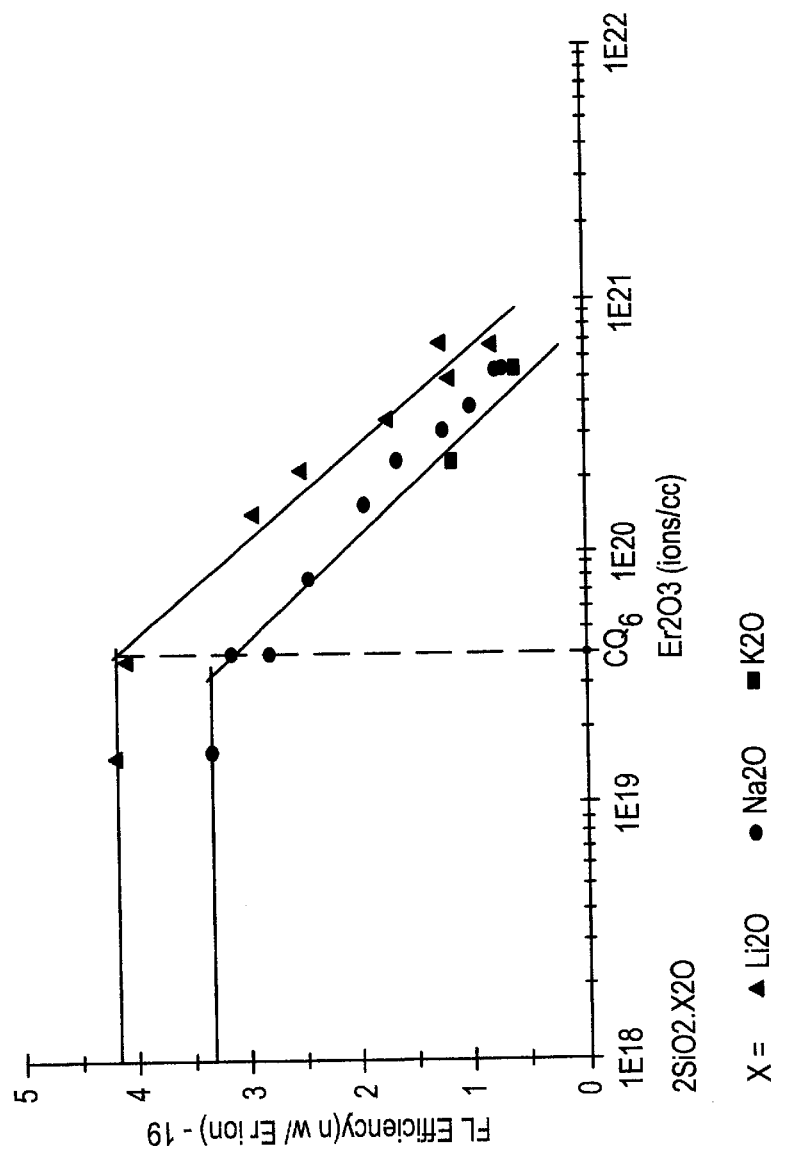

FIG. 2 is a graph illustrating the effects of concentration quenching on fluorescence efficiency of typical silica based glasses. In FIG. 2, concentration levels of $Er_2O_3$ in ions/cc, are plotted on the horizontal axis, while fluorescence efficiency (FL efficiency) in (nw/Er ion)$^{-19}$ is plotted on the vertical axis. Fluorescence efficiency is Another feature of the glasses according to the present invention is their ability to be doped with relatively high concentrations of erbium oxide ($Er_2O_3$). In the absence of a silica-based glass, high concentrations of $Er_2O_3$ doping provide excellent fluorescent effects that are important for optical signal amplification by laser pumping due to the reduction of ion clustering and upconversion quenching. This property provides an excellent amplification medium for use in optical amplifiers for the 1550 nm wavelength. According to another aspect, the present invention is directed to an erbium-doped optical amplifier comprising a medium for optical amplification comprising a fluorophosphate glass composition. Preferably, the fluorophosphate glass composition is doped for 100 parts by weight constituted by:

TABLE 3

(parts by weight)

| $P_2O_5$ | 15–40 | $MgF_2$ | 0–10 |
|---|---|---|---|
| $Al_2O_3$ | 0–5 | $CaF_2$ | 0–25 |
| MgO | 0–9 | $SrF_2$ | 0–25 |
| CaO | 0–9 | $BaF_2$ | 0–20 |
| SrO | 0–9 | $KHF_2$ | 0–2 |

TABLE 3-continued (parts by weight)

| BaO | 0–45 | $K_2TiF_6$ | 0–2 |
|---|---|---|---|
| $AlF_3$ | 5–25 | | | with about 0.01 to 10 parts by weight of $Er_2O_3$.

According to another embodiment of the present invention, the erbium-doped optical amplifier medium comprises, with regard to components other than erbium oxide, 100 parts by weight constituted as shown in Table 4 below. defined as the 1.55 μm fluorescence per Er ion versus Er concentration. For the ion concentrations levels of interest, i.e., between 3 to 5 E20 Er ions/cc (approximately 4–7 parts by weight), the fluorescence efficiency of the silica-based glasses is between 5 to 2 E-19 nW/ion.

Figure 3:
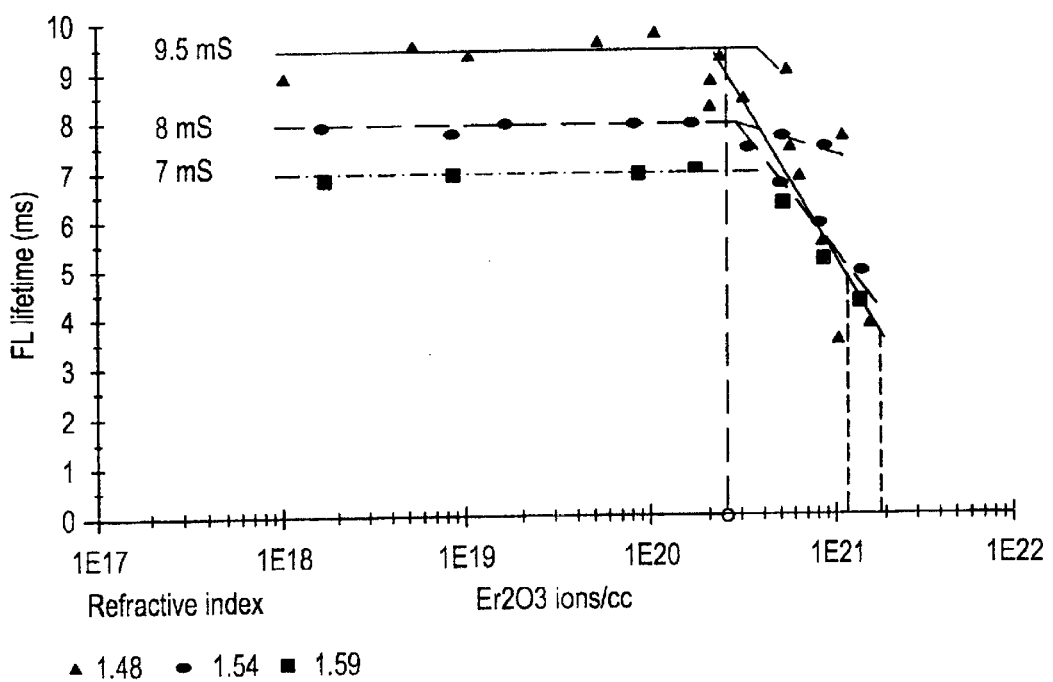
FIGS. 3 and 4 are graphs illustrating fluorescence lifetime and efficiency of fluorophosphate glasses according to the present invention.
Figure 4:
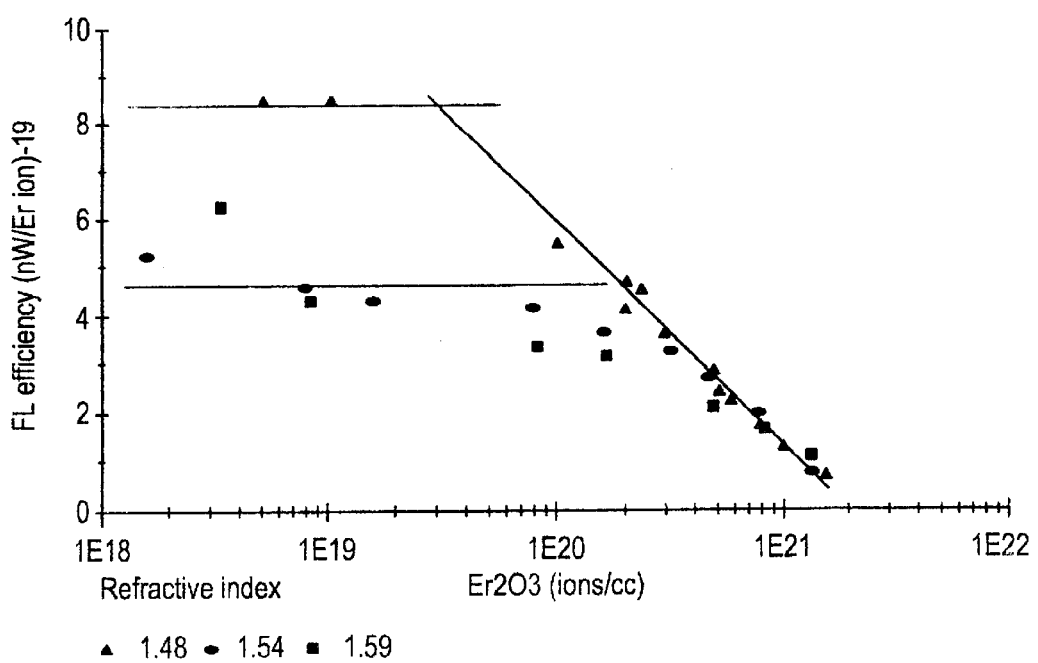

FIG. 3 corresponds to FIG. 1 is a graph illustrating the effects of concentration quenching on the fluorescence lifetime of three types of fluorophosphate-based glasses shown as Example 1–3 in Table 5 FIG. 4 is a graph illustrating the effects of concentration quenching on fluorescence efficiency of three types of fluorophosphate-based glasses according to the present invention. As shown in FIGS. 3 and 4, both $C_{qb}$ and $C_q$ are one order of magnitude higher than the corresponding values for the silica-based glasses. This indicates that the concentration quenching behavior at high concentration levels of Er ions is relatively weak in the fluorophosphate glasses according to the invention, and that these glasses are very good candidates for short length, high gain optical signal amplifiers. A comparison of composition with associated measured and calculated properties of three types of fluorophosphate glasses according to the present invention, a typical borosilicate-based glass and ZBLAN are provided in Table 5. The compositions in Table 5 are expressed as batch quantity. The actual ingredients of the batch can consist of any type of raw material, oxides, fluorides or phosphates, which when melted together, are converted into desired oxides and fluorides in the proper proportions. Examples of raw materials (not exhaustive ) are: $Ca(PO_3)_2$, $Ba_2P_2O_7$, $Al_4(P_2O_7)_3$, $Al(PO_3)_3$, $NaPO_3$, $K_2TiF_6$, $X_2O_y$, $XF_y$ where X is the metal ion of valence y.

The values given in Table 5 (life the values given elsewhere in this text) represent the theoretical quantities of the different components in the final glass, according to normal practice in this field. In the case of oxides, the theoretical quantities are very close to the natural quantities (that is, the "batch yield" is very close to 100% for the oxides). In the case of the fluorides, which are more slatile, the actual values are slightly lower than the theoretical values (the batch yield is about 90 to 95%).

TABLE 5

| Code | Example 1 | Example 2 | Example 3 | Borosilicate type glass | ZBLAN2 molar % |
|---|---|---|---|---|---|
| parts by weight | | | | | |
| $SiO_2$ | | | | 66.6 | |
| $B_2O_3$ | | | | 11.6 | |
| $P_2O_5$ | 16.9 | 24.0 | 30.9 | | |
| $Al_2O_3$ | 3.2 | 2.7 | 1.6 | | |
| $MgF_2$ | 5.8 | 7.5 | 0.0 | | |
| $CaF_2$ | 18.7 | 0.5 | 0.0 | | |
| $SrF_2$ | 19.7 | 17.9 | 0.0 | | |
| $BaF_2$ | 11.3 | 14.4 | 1.5 | | 22 |

TABLE 5-continued

| Code | Example 1 | Example 2 | Example 3 | Borosilicate type glass | ZBLAN2 molar % |
|---|---|---|---|---|---|
| $AlF_3$ | 19.3 | 11.3 | 9.5 | | 4 |
| $ZrF_4$ | | | | | 48 |
| $InF_3$ | | | | | |
| $LaF_3$ | | | | | 3.2 |
| NaF | | | | | 22 |
| $KHF_2$ | 1.3 | 0.0 | 0.0 | | |
| $K_2TiF_6$ | 0.6 | 0.5 | 0.0 | | |
| $Na_2O$ | 0.5 | 0.0 | 0.0 | | |
| $K_2O$ | | | | | |
| CaO | 0.0 | 5.1 | 0.0 | | |
| SrO | 0.0 | 2.4 | 8.5 | | |
| BaO | 2.7 | 13.7 | 43.2 | | |
| MgO | 0.0 | 0.0 | 4.9 | | |
| $ErF_3$ | | | | | 0.8 |
| $Er_2O_3$ | 6.0 | 4.0 | 1.5 | 2 | |
| $Er_2O_3$ (ions/cm$^3$) | 5.84E + 20 | 4.64E + 20 | 1.6E + 20 | 1.6E + 20 | 1.5E + 20 |
| Index | 1.49 | 1.54 | 1.59 | 1.52 | |
| Density | 3.62 | 3.83 | 3.976 | 2.552 | |
| Fluorescence lifetime | 6.8 | 7.6 | 7 | 6.3 | |
| Fluorescence lifetime at low Er content (ms) | 9.5 | 8 | 7 | 16 | |
| QE (%) | 68 | 95 | 100 | 39 | |
| Fluorescence efficiency (nW/Er ion)*1E-19 | 2.3 | 2.7 | 3.2 | 1.3 | |
| Cross-sections (cm$^2$)*1E-21 Absorption Pump | | | | | |
| 975 nm | 1.9 | 2.3 | (980 nm) 0.8 | | 2.6 |
| 1480 nm | 3.3 | 3.9 | | 1.2 | 4.7 |
| Absorption Signal ($\sigma_{ab}(\lambda)$) | | | | | |
| 1533 nm | 4.9 | 5.9 | (1527 nm) 5.6 | | |
| FWHM (nm) | 65 | 64 | | 15 | |
| Emission Signal ($\sigma_{em}(\lambda)$) | | | | | |
| 1522 nm | 5.3 | 6.5 | (1537 nm) 7.2 | | 6 |
| FWHM (nm) | 51 | 49 | | 17 | |
| Emission/absorption | 1.1 | 1.1 | | 1.3 | 1.1 |
| Radiative lifetime (ms) | 10 | 8 | | 16 | 8 |

The batch ingredients are mixed together to provide homogeneity, placed inside a platinum crucible, and Joule-heated at about 1000° C. When melting is completed, the temperature is raised to between 1050 to 1350° C. to obtain glass homogeneity and fining. The melt then is cooled and simultaneously formed into the desired shape, and finally transferred into an annealing furnace operating at about 400° C. An alternative melting process consists of forming the glass from batch ingredients and remelting this glass together with the desired proportion of Er or/and Yb raw materials. This procedure can in some cases increase homogeneity of the glass.

As seen in Table 5, the Quantum Efficiency $\tau_{obs}/\tau_{rad}$ is in the range of 70 to 100% for the fluorophosphate glasses according to the present invention at the desired Er concentration levels, whereas the Quantum Efficiency for the silica-based glasses at the same concentration level is in the range of 20 to 35%.

One limitation to the full use of bandwidth in WDM systems is the spectral nonuniformity of gain exhibited in silica-based glass EDFA. Another important feature of the high concentration Er-doped fluorophosphate compositions according to the present invention as compared to silica-based glasses is that the fluorophosphate glasses exhibit a very flat gain spectrum, over a range of approximately 28 to 30 nm in the 1550 nm bandwidth. This is comparable to Er doped ZBLAN glass fibers. To obtain this gain flatness between 1528 and 1563 nm the glass medium according to the present invention has a fluoride content in the range of 7–88 parts by weight and preferably has a fluorine content of at least 18 parts by weight. A good representation of gain spectral shape versus wavelength can be obtained using the following formula:

$$g(cm^{-1}) = \{\sigma_{em}(\lambda)^*N_2 - \sigma_{ab}(\lambda)^*N_1\} \tag{1}$$

where:

$\sigma_{em}(\lambda)$ is the emission cross section in cm$^2$;

$\sigma_{ab}(\lambda)^*$ is the absorption cross section ion cm$^2$;

$N_2$ is the upper level ($^4I_{13/2}$) ion population (averaged over the length);

$N_1$ is the ground state ($^4I_{15/2}$) ion population (averaged over the length; and $N_t$ is the total Er ion concentration (in ions per cm$^3$).

If the inversion percentage is defined as $D=(N_2-N_1)/N_t$, then equation (1) can be rewritten as:

$$G(dB/cm) 2.15^*N_t^*\{\sigma_{em}(\lambda)^*(1+D) - \sigma_{ab}(\lambda)^*1-D)\} \tag{2}$$

where:

D+−1: % inversion; and

D++1: 100% inversion.

Equation 2 was used to calculate the gain shape versus wavelength of different glass compositions, the results of which are shown in FIGS. 5–9.

FIGS. 5–9 are graphs illustrating gain shape versus wavelength for the five glasses of TABLE 5. Gain, in dB/cm., is plotted on the vertical axis, while wavelength in nanometers (nm.) is plotted on the horizontal axis, in each FIGURE.

Figure 5:
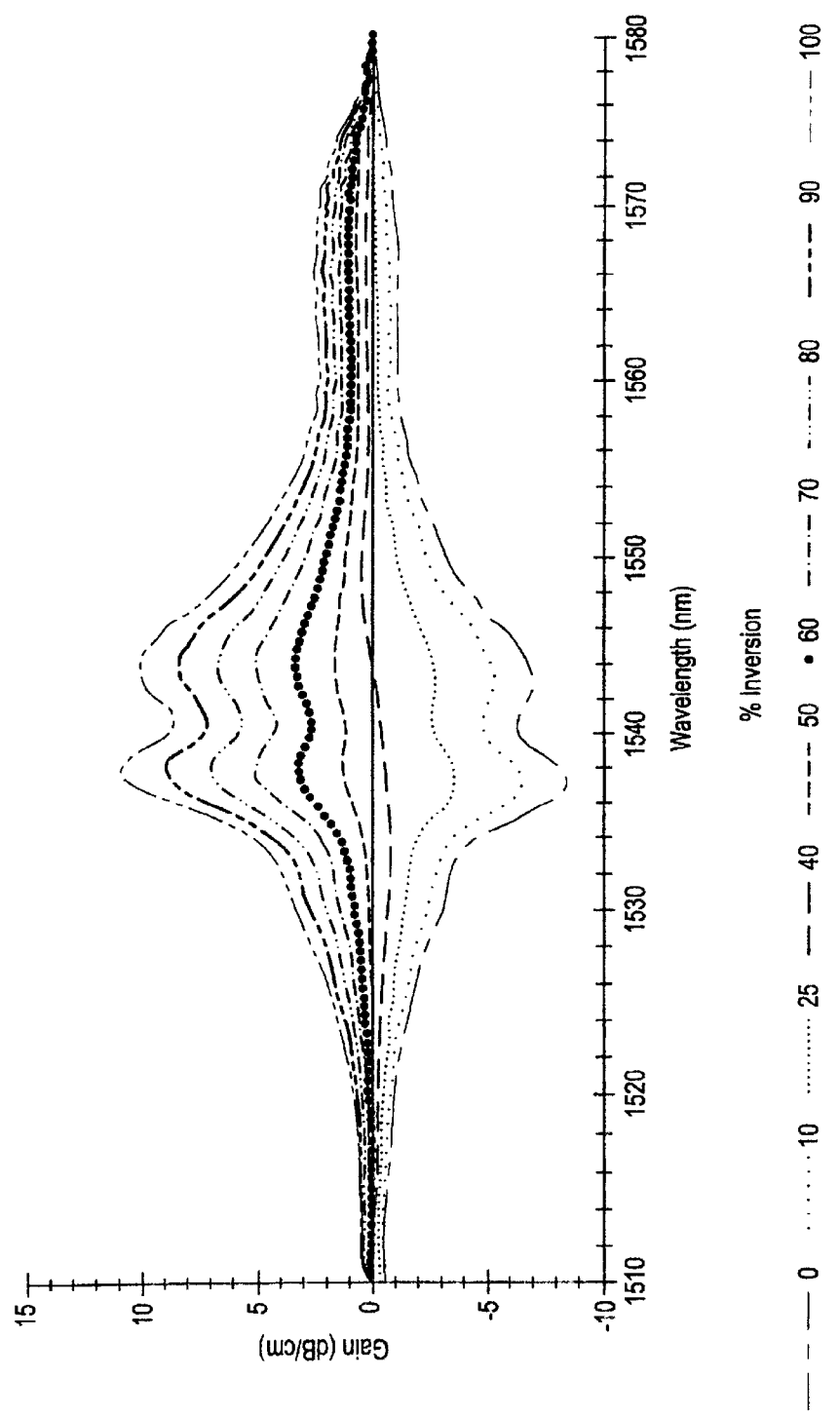
FIG. 5 is a graph illustrating gain shape versus wavelength for a typical silicate based glass.

FIG. 5 illustrates the gain shape of a typical borosilicate type glass used in optical signal amplifiers. It is clear that the gain spectrum around the 1550 nm bandwidth which is used in WDM, is nonuniform in character. Amplification between about 1535 nm and 1565 nm, a typical range used in WDM, is uneven. The variation between the maximum and minimum gain can reach 250%.

Figure 6:
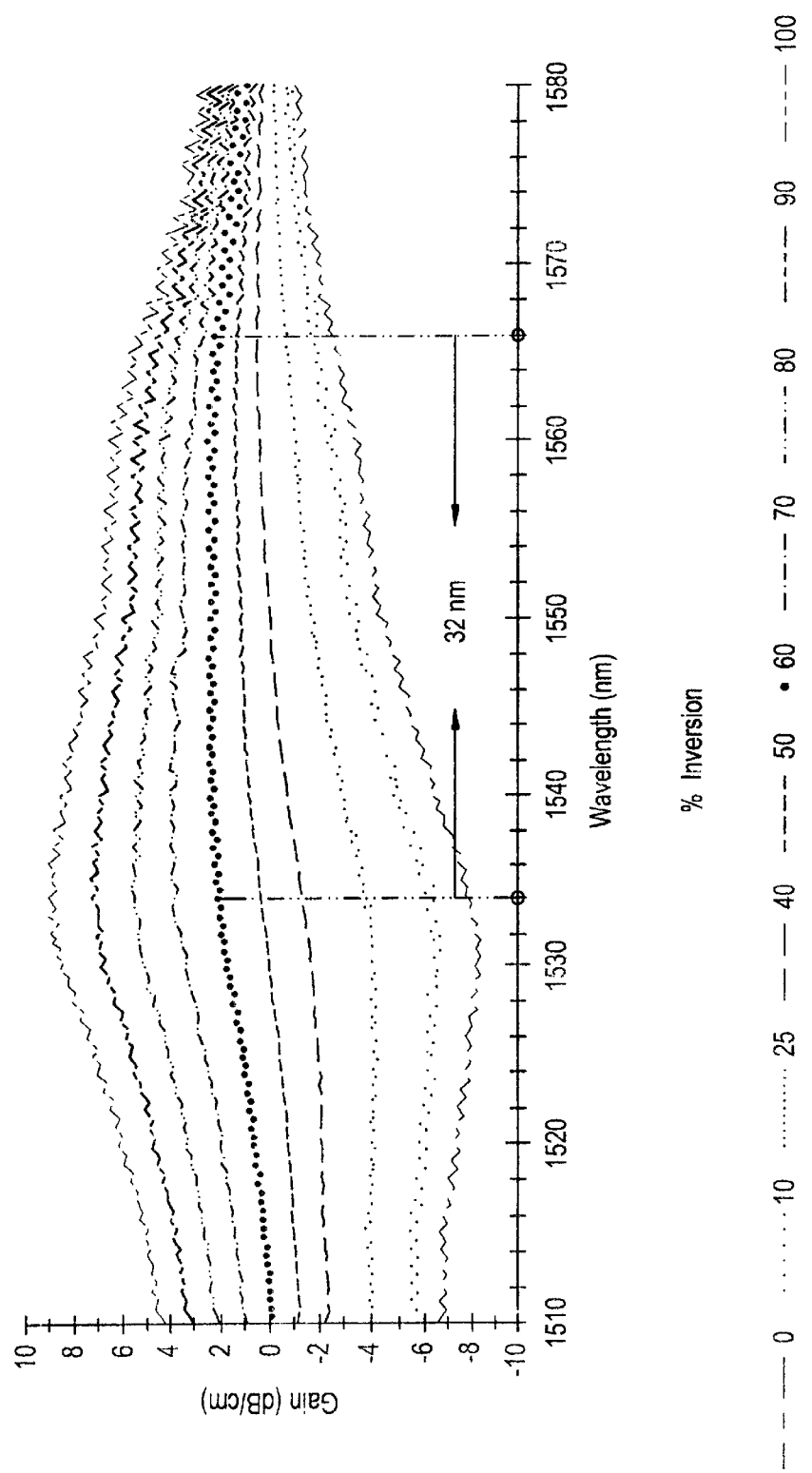
FIG. 6 is a graph illustrating gain shape versus wavelength for a typical ZBLAN glass.

FIG. 6 illustrates the gain shape of a ZIBLAN glass for use in an optical signal amplifier. In comparison to the borosilicate type glass, ZBLAN offers a flattened gain shape over a range of wavelengths about 30 nm wide.

Figure 7:
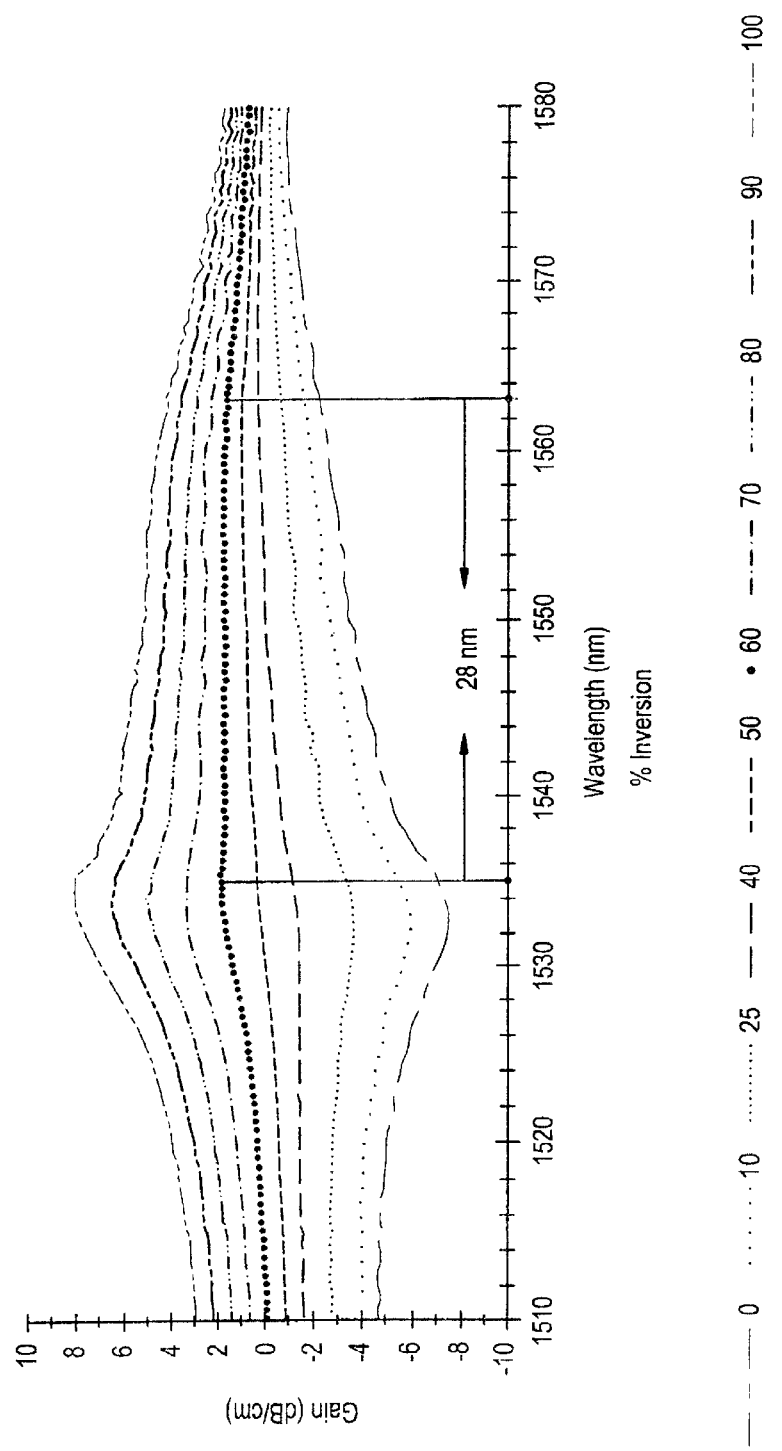
FIGS. 7–9 are graphs illustrating gain shape versus wavelength for fluorophosphate glasses according to the present invention.

FIG. 7 illustrates the gain shape for a first fluorophosphate type glass according to the present invention. This glass, identified as Example 1 has an Er concentration over 7 parts by weight for 100 parts by weight of other components, yet still exhibits a substantially flat gain shape over a 28 nm spectrum in the 1530–1560 nm band.

Figure 8:
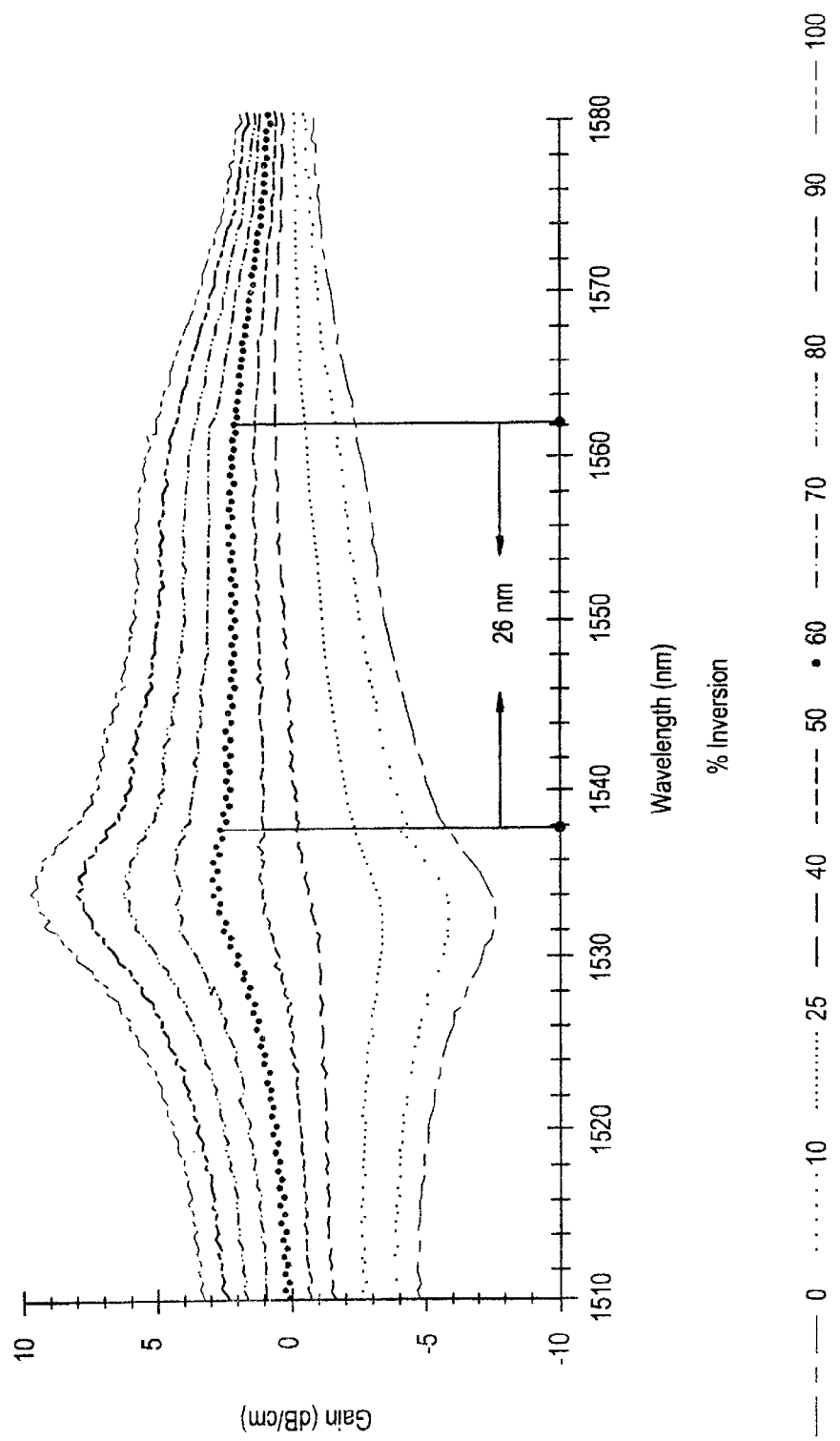

FIG. 8 illustrates the gain shape for a second type of fluorophosphate glass according to the present invention. This glass, identified as Example 2, has an Er concentration over 4 parts by weight for 100 parts by weight of other components and exhibits a flattened gain shape over about a 26 nm spectrum.

Figure 9:
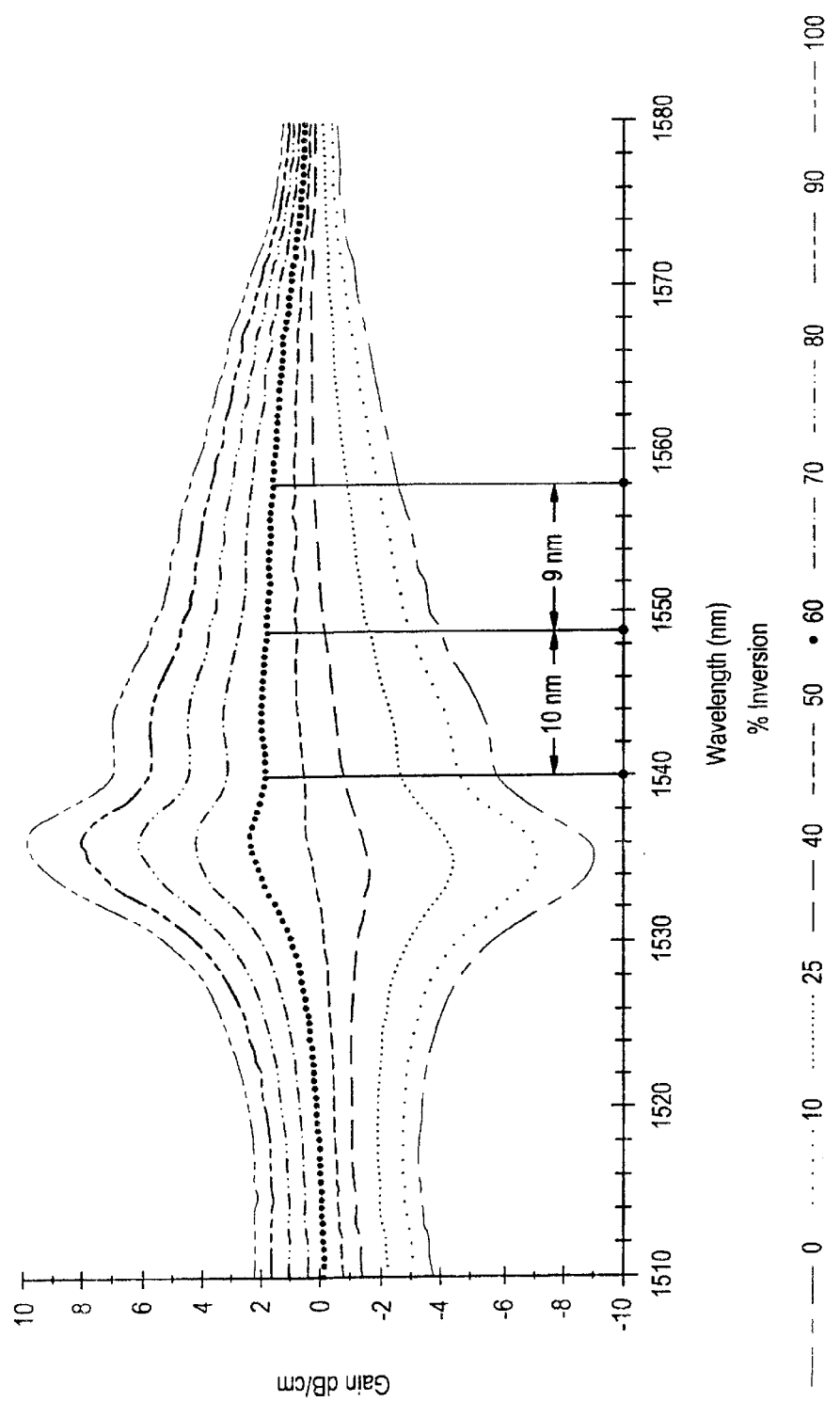

FIG. 9 illustrates the gain shape a phosphate-based glass. This glass, identified as Example 3 has an Er concentration slightly less than 3 parts by weight, for 100 parts by weight of other components, and exhibits two relatively flat areas of gain; the first being about 10 nm wide arid the second about 9 nm in width.

Another aspect of the present invention is the ability to efficiently pump the amplifying medium at 980 nm while maintaining relatively low noise levels. Optical amplification requires excitation of erbium ions in the glass medium to a higher energy level, and then relaxation of the ions This process causes emission of photons as the erbium ions relax to ground level. The photons emitted during this process are at a wavelength so as to amplify optical signals at the same wavelength.

Considering the first three energy levels of erbium, useful emission occurs between level 2 (the metastable level) to level 1 (the ground level). To have population inversion (population at level 2 higher or equal than 50%) and, therefore, gain, the gain medium must be pumped with an external source. Generally, with optical signal amplification, the gain medium is pumped with a 980 or 1480 nm diode laser. When a 980 nm diode laser is used, electrons move to the third level ($^4I_{11/12}$) and then relax to the second level and then to the ground level by emitting a 1.55 μm photon. When a 1480 nm diode laser is used, electrons move directly to the lasing level (2) and then to the ground level by emitting a 1.55 μm photon. The most efficient and reliable pump for optical amplification is a 980 nm pump. However, because the 980 nm pumping process moves the electrons to the third level, the lifetime at level (3) should be very low, preferably on the order of micro seconds, otherwise the electrons may be excited to upper levels and thereby decrease pump efficiency. This in fact happens with ZBLAN-like glass medium when pumped with a 980 nm pump due to its relatively long lifetime at level (3) (around 9 ms). Accordingly, a ZBLAN-like amplifying medium cannot be pumped as efficiently as the inventive fluorophosphate glass medium with a 980 laser diode pump.

Er-doped fluorophosphate glass according to the present invention as an amplification medium with a 980 nm pump, has advantages over other Er-doped fluorides. ZBLAN-like (100% fluoride no oxygen) compositions, due to high fluorescence lifetime (9 ms) at the $^4I_{11/12}$ pumping level, lose pumping efficiency. ZBLAN-like compositions are, therefore, usually pumped at 1480 nm. However, there are drawbacks to pumping at wavelengths this high. For example, the ion population cannot be fully inverted at this level and noise in the amplifier increases. To the contrary, the fluorophosphates glass medium according to the present invention can be efficiently pumped at 980 nm since the $^4I_{11/12}$ lifetime time is in the range of 10 to 70 μs.

FIGS. 5–9 illustrate that fluorophosphate glasses according to the present invention show gain flattening characteristics using a 980 nm pump similar to ZBLAN, and significantly improved in comparison with silicates and phosphates. The glass compositions according to the present invention provide high and flattened gain characteristics in short length optical amplifiers, and then can be used for the manufacturing of planar amplifiers and/or short length single mode fibers having ZBLAN-like gain that are useful in WDM and other similar applications.

What is claimed is:

1. A fluorophosphate amplifier glass for use in optical amplification, that is essentially silica-free, and in which 100 parts by weight comprise:

| | | | |
|---|---|---|---|
| $P_2O_5$ | 16.9–24.0 | $MgF_2$ | 0–7.5 |
| $Al_2O_3$ | 1.6–3.2 | $CaF_2$ | 0–18.7 |
| MgO | 0–5.0 | $SrF_2$ | 0–19.7 |
| CaO | 0–5.1 | $BaF_2$ | 1.5–11.3 |
| SrO | 0–8.5 | $KHF_2$ | 0–1.3 |
| BaO | 2.7–43.2 | $K_2TiF_6$ | 0–0.6 |
| $AlF_3$ | 9.3–19.3 | | | the glasses additionally containing 0.01 to 10 parts by weight of $Er_2O_3$ as a dopant.

2. A fluorophosphate glass according to claim 1 that further comprises 0.01 to 15 parts by weight of $Yb_2O_3$.

3. A fluorophosphate glass according to claim 1 having a fluoride content in the range of 7 to 88 parts by weight.

4. A fluorophosphate glass according to claim 3 having a fluoride content greater than or equal to 18 parts by weight.

5. An erbium-doped optical amplifier comprising a medium for optical amplification, said medium comprising a fluorophosphate glass having a composition in which 100 parts by weight are of a glass composed of:

| | | | |
|---|---|---|---|
| $P_2O_5$ | 15–40 | $MgF_2$ | 0–10 |
| $Al_2O_3$ | 0–5 | $CaF_2$ | 0–25 |
| MgO | 0–9 | $SrF_2$ | 0–25 |
| CaO | 0–9 | $BaF_2$ | 0–20 |
| SrO | 0–9 | $KHF_2$ | 0–2 |
| BaO | 0–45 | $K_2TiF_6$ | 0–2 |
| $AlF_3$ | 5–25 | | | and the glass additionally contains 0.01 to 10 parts by weight of $Er_2O_3$ as a dopant.

6. An erbium-doped optical amplifier according to claim 5, in which the fluorophospate glass has a chemical composition comprising in parts by weight:

| | | | |
|---|---|---|---|
| $P_2O_5$ | 16.9–24.0 | $MgF_2$ | 0–7.5 |
| $Al_2O_3$ | 1.6–3.2 | $CaF_2$ | 0–18.7 |
| MgO | 0–5.0 | $SrF_2$ | 0–19.7 |
| CaO | 0–5.1 | $BaF_2$ | 1.5–11.3 |
| SrO | 0–8.5 | $KHF_2$ | 0–1.3 |
| BaO | 2.7–43.2 | $K_2TiF_6$ | 0–0.6. |
| $AlF_3$ | 9.5–19.3 | | |

7. An erbium-doped optical amplifier according to claim 5 or 6, further comprising about 0.01 to 15 parts by weight of $Yb_2O_3$.

8. An erbium-doped optical amplifier according to claim 5, wherein said optical amplifier is a planar-type optical amplifier.

9. An erbium-doped optical amplifier according to claim 5, wherein said optical amplifier is a single mode fiber type optical amplifier.

10. An erbium-doped optical amplifier according to claim 5, wherein the fluorophosphate glass has a fluoride content in the range of 7 to 88 parts by weight.

11. An erbium-doped optical amplifier according to claim 10, wherein the fluoride content is at least 18 parts by weight.

12. An optical amplifier, that comprises;

an active optical medium having an input and an output, said active optical medium being doped with a fluorescent dopant, said active optical medium receiving at its input optical signals having wavelengths in the range of about 1525 to 1570 nm; and a pump source supplying pumping light power at a wavelength of about 980 nm to said active optical medium, the pumping light being adopted to excite said fluorescent dopant to emit photons to amplify said optical signals in a range of wavelengths about 20 to 30 nm wide with a substantially flat gain spectrum of less than about 13% gain variation in the spectral range of about 1525 to 1565 nm, wherein the quantum efficiency of said active optical medium exceeds about 65%, said quantum efficiency being the ratio between the fluorescence lifetime of said active optical medium and the radiation lifetime, the optical medium being composed of a fluorophosphate glass in accordance with claim 1.

* * * * *